United States Patent [19]

Egli

[11] 4,376,600
[45] Mar. 15, 1983

[54] ROTATING MATERIAL FEED FOR APPARATUS FOR PNEUMATIC CONVEYING OF LOOSE MATERIALS

[75] Inventor: Ernst Egli, Fahrweid, Switzerland

[73] Assignee: Aliva Aktiengesellschaft, Widen-Mutschellen, Switzerland

[21] Appl. No.: 261,549

[22] Filed: May 7, 1981

[30] Foreign Application Priority Data

May 27, 1980 [CH] Switzerland ................... 4113/80

[51] Int. Cl.$^3$ ............................................ B65G 53/46
[52] U.S. Cl. .................................... 406/63; 222/242; 222/254; 406/64
[58] Field of Search ..................... 406/62, 63, 64, 66, 406/67, 68; 414/217; 222/227, 242, 252, 254, 636

[56] References Cited

U.S. PATENT DOCUMENTS 1,764,998  6/1930  Bailey ................................. 406/66
2,151,511  3/1939  Hagen ................................. 406/63
4,092,046  5/1978  Bombelli et al. ................. 406/63 X Primary Examiner—Jeffrey V. Nase
Attorney, Agent, or Firm—James E. Nilles

[57] ABSTRACT

The apparatus of this invention feeds coarse-grained, lumpy dry materials from a hopper (1) to an outlet chamber (19) into which materials are blown. It has two rotors (5, 15) that rotate in unison about a common vertical axis and have circumferentially arranged material chambers (24, 25) that are coaxial with one another. A plate (7) between the two rotors (5, 15) has a passage (8) with which the chambers (24, 25) of the rotors (5, 15) can be brought into register by rotor rotation. The upper rotor (5) has a plurality of air chambers (26, 27) which receive pressure air conducted through the passage (8) from each of the chambers (25) of the lower rotor (15). A connecting channel (28) serves to increase the pressure on the outer side of the chambers (25) of the lower rotor (15). Multiple openings into the atmosphere discharge the chambers (24, 26, 27) of the upper rotor (5). With this arrangement the pressure drop $\Delta p$ is reduced and the distance between a pressurized rotor chamber and an unpressurized one is substantially increased, thereby reducing dust production and wear.

3 Claims, 3 Drawing Figures

ROTATING MATERIAL FEED FOR APPARATUS FOR PNEUMATIC CONVEYING OF LOOSE MATERIALS

FIELD OF THE INVENTION

This invention relates to a rotating material feeder for apparatus for pneumatically feeding loose materials such as dry concrete mix; and the invention is more particularly concerned with a rotary feeder that delivers to a pneumatic conveyor and wherein there are relatively low pneumatic pressures across the pressure air seals so that the rotary feeder can be of lighter construction than prior apparatus of the same type.

BACKGROUND OF THE INVENTION

In known material feeders for concrete mixing machines and the like that operate according to the rotor principle, the dry mixture from an open filling hopper arrives at a feed duct by way of a rotor with an upright axis that is sealed off on both sides with rubber discs.

When not rotating, the rotor acts as a closed valve that prevents movement of material from the hopper to an outlet opening or blow-off chamber from which the material is carried away pneumatically. When rotating, the rotor effects transfer of material from the hopper to the blow-off chamber at a predetermined rate. Since the hopper is open to the atmosphere and the material is carried away from the blow-off chamber or outlet by air under substantially high pressure, the rotor also serves as a type of sluice gate or air lock.

Extending through the rotor are cylindrical or segment shaped material chambers that are spaced at like distances from the rotor axis, each open at its top and at its bottom. An inlet that opens downwardly from the hopper, and through which each material chamber can be charged, is located at one point in the orbit of the chambers so that rotation of the rotor brings each chamber, in turn, beneath the inlet opening to have material fall into it from the hopper. The material is encouraged to drop down through the inlet opening by an agitator star in the hopper. As the rotor turns, it carries each filled chamber, in turn, around to an outlet opening that is substantially diametrically opposite the inlet opening. At the outlet opening, pressure air, forced down into the rotor chamber from above, drives the fed material downward out of the rotor chamber and into the blow-off chamber from which the material passes into a feed duct. After about a quarter of a turn, the empty but pressurized rotor chamber is vented shortly before it comes back under the inlet opening, so that material to be fed can fall down into the chamber without being repelled by pressurized air. In a similar manner the process is repeated with each chamber and rotation.

In concrete machines of this type, the water needed for the setting process is added at the end of the feed duct, by means of a spray device.

These known machines have the disadvantage that the rotor and the discs that cover it undergo a high abrasion, since the discs must seal off the rotor outwardly and inwardly from atmospheric pressure and must therefore engage it under high contact pressure. The pressure to be sealed off is equal to the air pressure employed for feeding the dry materials. The large forces that arise from such pressures can only be taken up and carried with a correspondingly heavy structure.

The emptied, pressurized rotor chambers must be vented shortly before they come under the material inlet opening. When wear begins, the pressure air clears a passage for itself along the worn sealing disc, from the blow-out opening to the venting opening, which passage increases with increasing wear; and in the worst case this can lead to destruction of the sealing disc.

Worn out seal plates always lead to dust formation. Dusty air issues at the venting opening and from between the seal plates and the rotor in the region of the pressurized rotor chambers.

By careful analysis it has been established that for heavy structures, the pressure drop $\Delta p$ from the feed pressure to atmospheric pressure is above all responsible for abrasion and the appearance of dust. In other words, the prevailing $\Delta p$ is the basis for the difficulty in sealing off the rotor and maintaining seals, and for such consequent phenomena as wear and dust.

This is to say that the feed pressure is responsible for dust, wear and the heavy, bulky type of construction heretofore regarded as necessary. Other factors that are also responsible for seal plate erosion and its consequences, such as the fed material, natural dust, and ordinary wear, cannot be influenced by the character of the feed machine.

Machines are also known in which the rotor is surrounded by a jacket that is connected with a filter device by means of connecting hoses. However, in such machines the low pressure around the rotor increases the pressure drop $\Delta p$, and this leads to still worse conditions.

The object of the present invention is to provide a material feeder for feeding dry mixes and the like of the type described above, wherein, to the greatest extent, the deficiencies of prior machines of that type have been eliminated in that the pressure drop $\Delta p$ is reduced and in that the distance between the pressurized rotor chamber and the unpressurized chamber can be substantially increased, for example, on the order of half a rotation.

In the materials feeder according to the present invention this problem is solved by the provision of a rotorsluice doser which is characterized by comprising at least two rotors that are known in and of themselves, arranged one over the other, of which at least the upper one has additional chambers acted upon by pressure air.

BRIEF DESCRIPTION OF DRAWINGS

A preferred embodiment of the invention is explained with reference to the accompanying drawings, wherein.

DETAILED DESCRIPTION OF PREFERRED EMBODIMENT OF INVENTION

Figure 1:
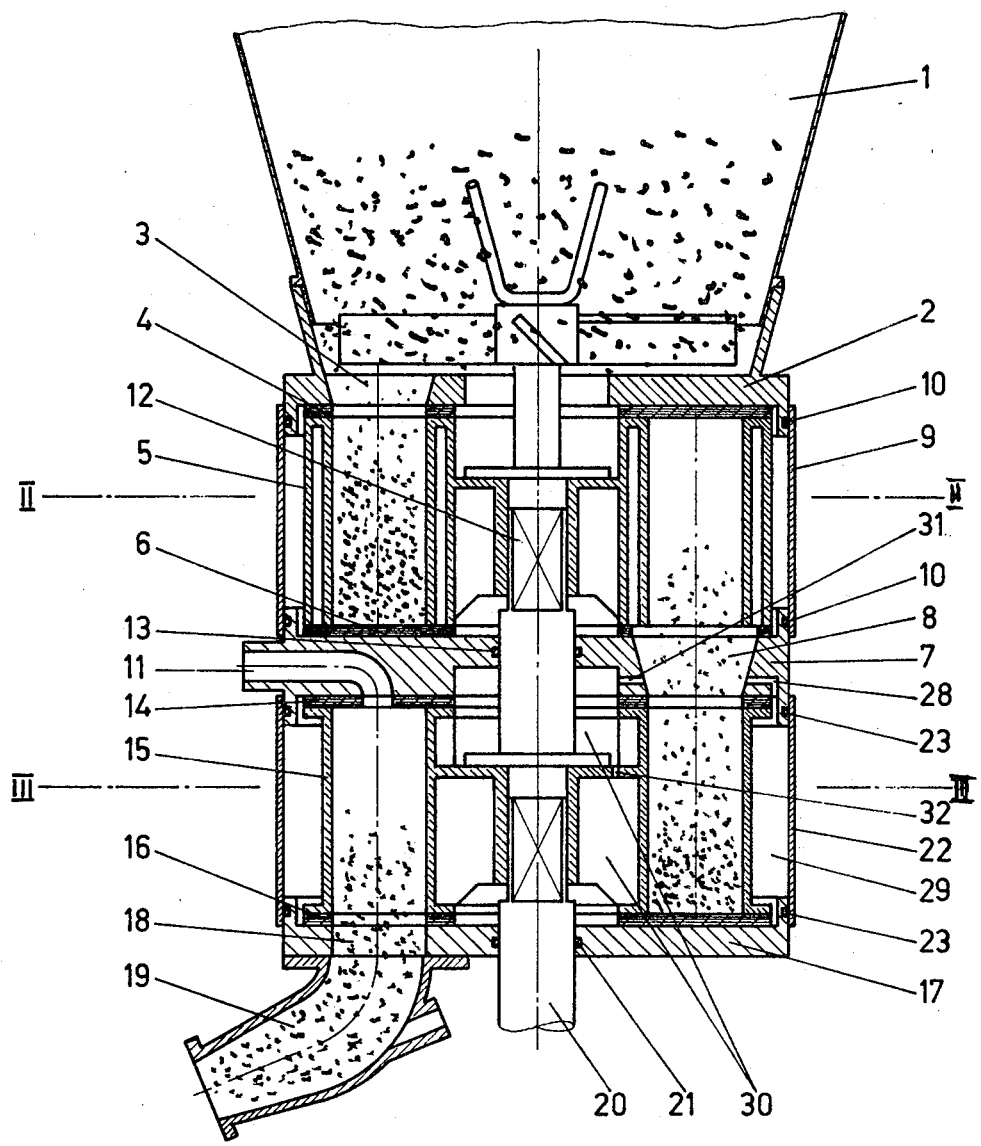
FIG. 1 is a longitudinal section through a material feeder.
Figure 2:
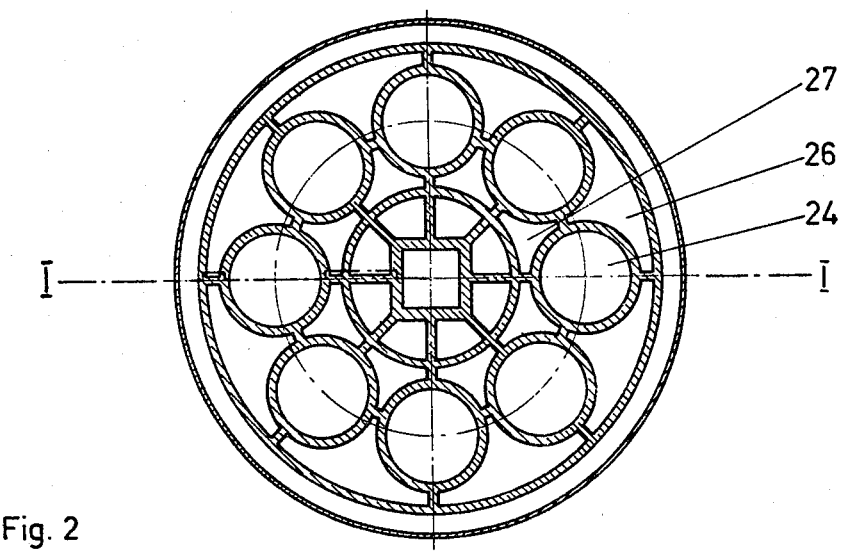
FIG. 2 is a section on line II—II in FIG. 1.
Figure 3:
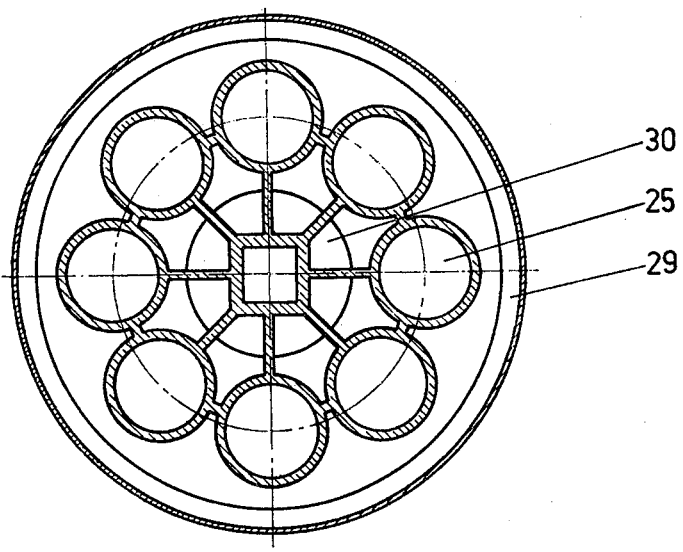
FIG. 3 is a section on line III—III in FIG. 1.

The material feeder has an upwardly opening hopper 1 that is clampingly secured on top of an end flange 2 in which there is an inlet opening 3 and which is secured against rotation by means of arresting supports (not shown). A sealing plate 4 of erosion resistant rubber is mounted to underlie the upper end flange 2 and to seal off the top of a rotating upper rotor 5. Another sealing plate 6 that seals off the bottom of the upper rotor 5 is fastened to a medial flange 7 which is secured against rotation and through which there is a delivery passage 8. The upper rotor 5 is further sealed off by a jacket pipe 9 which surrounds it and which is connected with the end flange 2 and the medial flange 7 by means of pressure seals 10. In the medial flange 7, diametrically opposite the delivery passage 8, there is a pressure air connection 11 that has a downwardly opening outlet. A drive shaft 12 extends rotatably through the medial flange 7, and a seal 13 is confined between that shaft and the flange 7 to prevent pressure air flow along the shaft. On the under side of the medial flange 7 is mounted a further sealing plate 14 that upwardly seals off a rotating lower rotor 15. A further sealing plate 16, which seals off the lower rotor at its bottom, is fastened on the top surface of a base plate 17. An outlet opening 18 in the base plate 17 opens into a blow-off chamber 19. A drive shaft 20, extending upward from a drive (not shown) and of which the shaft 12 comprises an upward continuation, is led through a seal 21 in the base plate 17. The lower rotor 15 is surrounded and sealed off by a jacket pipe 22 that is connected with the medial flange 7 and the base plate 17 by means of seals 23. By means of tension devices (not shown), the end flange 2 is connected under tension with the base plate 17 so that the sealing plates 4, 6, 14 and 16 lie upon the rotors 5 and 15 with the pressure necessary for sealing.

In contrast to the conventional material feeders, the apparatus of this invention has at least two synchronously rotating rotors 5 and 15 that are arranged one above the other, separated by the medial flange 7. The two rotors 5 and 15 have a like number of bores extending through them that define upwardly and downwardly opening chambers 24 and 25 which receive the feed material and transport it from the inlet opening 3 to the outlet opening 18. The passages 3, 8 and 18 through the respective flanges 2, 7 and 17 have a width, as measured in the direction radial to the feeder, that is equal to or slightly greater than the diameters of the rotor chambers 24, 25; but those passages have a greater extent in the circumferential direction to provide for adequate filling and emptying times during rotation of the rotors. In the upper rotor 5 there are arranged, around the chambers 24 that extend through it, additional outer and inner pressure air chambers 26, 27 that are closed at their tops and can therefore receive no feed material. If the upper rotor 5 has an outer chamber 26 and an inner chamber 27 adjacent to each of its material carrying chambers 24, and if the volume of the outer chamber 26 together with that of the inner chamber 27 is substantially equal to the volume of the rotor chamber 24, then the following occurs in the delivery of the feed material through the delivery passage from the upper rotor 5 to the lower rotor 15:

The lower rotor 15, by its rotation, brings an empty but pressurized rotor chamber 25 into register with the delivery passage 8. Simultaneously, the upper rotor 5 rotates to brings into register with the delivery passage 8 a rotor chamber 24 that is filled with feed material and also its adjacent empty, unpressurized inner and outer chambers 27 and 26. The pressure air in the lower rotor chamber 25 expands into the unpressurized chambers 26 and 27, which together have the same volume as the lower rotor chamber 25. The air that pressurized the lower rotor chamber 25 thus expands to approximately double its volume, and the value of its pressure is therefore reduced by substantially one-half. When the pressure balance is fulfilled, the upper rotor chamber 24 empties into the lower rotor chamber 25 through the passage 8.

A pressure substantially equal to the pressure prevailing in the area of the delivery passage 8 is built up in the outer space 29, between the jacket pipe 22 and the lower rotor 15, by means of an outer bore 28 which communicates the passage 8 with the space 29. In like manner, the inner space 30, between the drive shaft 12, 20 and the lower rotor 15, is communicated with the passage 8 by means of inner bores 31 and 32.

The walls of the material chamber 24 of the upper rotor can be made of elastic rubber or otherwise so formed that they can breathe. The chambers 24, 26 and 27 in the upper rotor 5 are under reduced pressure and are vented shortly before reaching the inlet opening 3 by means of respective ones of three bores (not shown) that open to those chambers. However, separate air vent bores could be provided for the outer chambers 26, for the material chambers 24 and for the inner chambers 27.

The overpressure in the blown-out rotor chambers 25, which corresponds to the feed pressure, is in this manner reduced in two steps, first from the lower rotor 25 to the upper rotor 5, by half, and thereafter, ahead of the inlet opening 3, to the outside pressure. Inasmuch as the outer space 29 and the inner space 30 are acted upon by reduced pressure, the pressure drop $\Delta p$ in the critical regions is reduced by half.

The volume of each of the chambers 25 and 24 is designated by $V_1$, their pressures by $p_1$ and $p_2$, respectively. The combined empty volumes of the chambers 24 and 25 at a time when material is being transferred from one to the other is $x \cdot V_1$. The volume of the chamber pairs 26, 27 is $V_2$, the pressure in the position according to FIG. 1 is $p_2$. Then the following applies approximately:

$$V_1 \cdot p_1 = V_2 \cdot p_2 + x \cdot V_1 \cdot p_2 + V_1 \cdot p_2, \text{ and}$$

$$\frac{p_1}{p_2} = \frac{V_2 + (x + 1)V_1}{V_1}.$$

With perfect seals the pressure in the outer and inner chambers 29 and 30 remains constant at $p_2$. Therefore, leakage losses of all kinds are also smaller, since $p_1 > p_2$ and the leakage air velocities are $c_1/c_2 = \sqrt{p_1/p_2}$. They can be markedly decreased by this expedient. Pressurization of the spaces 29 and 30 could also be accomplished directly from the pressure air connection 11 through a reducing valve. This would require additional means, however.

In applying the principles of this invention it is possible to provide other pressure conditions, with a different number of suitable rotors having other volumetric relationships of their pressure air chambers. It is further possible, by a corresponding combination, to prevent the overpressure in the rotor chamber 25 of the lower rotor 15 from ejecting feed materials from the rotor chamber 24 of the upper rotor 5. The air vent opening can also be connected with a cyclone separator with a filter, and the vent air can in this way be cleaned of dust.

In a theoretical model $\Delta p$ can be reduced to practically zero with an arbitrary number of rotors, and the distance between the pressurized and the unpressurized chamber can be arbitrarily lengthened.

Since the sealing forces are at least halved, the machine can be designed for light-type construction and can thus be made convenient to maintain.

The multiple-rotor system brings the following advantages:

The feed pressure is reduced in one or more steps. This gives a smaller pressure drop from step to step.

The distance from the blow-off hole to the vent is multiplied.

The machine can be built in light type construction, because the seal forces are reduced, as for example to half of the value they would have in a corresponding prior machine.

What I claim is:

1. An infeed device for transferring loose dry material from a hopper to an outlet from which the material is carried by pressure air, said infeed device comprising rotor means rotatable on a vertical axis and having circumferentially arranged material chambers that are open at their tops and bottoms, and said infeed device further comprising fixed structure on which said hopper is supported and which comprises vertically spaced horizontal plates between which said rotor means rotates and with which it has sealing engagement at its top and bottom, an upper one of said plates having therein a material inlet through which material falls from said hopper into material chambers that are brought beneath said inlet by rotor rotation, and said fixed structure having a pressure air inlet from which pressure air is blown downwardly through material chambers that are upwardly aligned with said outlet, for discharge of material into and beyond said outlet, said infeed device being characterized by:

A. said rotor means comprising at least two rotors, one above the other, that are coaxial and are constrained to rotate in unison, said rotors having like numbers of material chambers so arranged that each material chamber in the upper rotor is coaxial with a material chamber in the rotor below it;

B. said fixed structure comprising a plate between said upper rotor and the one therebeneath, in sealing engagement with those rotors, having a passage therein through which material can fall from chambers of the upper rotor into chambers of the rotor therebeneath, said passage being circumferentially spaced from said material inlet; and C. said upper rotor having pressure chambers therein which are closed at their tops and which have open bottoms that register with said passage as the upper rotor rotates, to receive pressure air from material chambers of said rotor therebeneath.

2. The infeed device of claim 1, further characterized by:

D. jacket means surrounding said rotor means and sealingly connected with said plates; and E. the space between said jacket means and the rotor means being communicated with said passage.

3. The infeed device of claim 1, further characterized by:

said passage being wider at its top than at its bottom to facilitate communication between material chambers therebeneath and pressure chambers of the upper rotor.

* * * * *